(12) United States Patent
Myllymaki

(10) Patent No.: US 9,256,852 B1
(45) Date of Patent: Feb. 9, 2016

(54) AUTONOMOUS DELIVERY PLATFORM

(71) Applicant: GOOGLE INC., Mountain View, CA (US)

(72) Inventor: Jussi Myllymaki, Espoo (FI)

(73) Assignee: GOOGLE INC., Mountain View, CA (US)

( * ) Notice: Subject to any disclaimer, the term of this patent is extended or adjusted under 35 U.S.C. 154(b) by 65 days.

(21) Appl. No.: 13/933,109

(22) Filed: Jul. 1, 2013

(51) Int. Cl.
G06Q 40/00 (2012.01)
G06Q 10/08 (2012.01)
G05D 1/02 (2006.01)
G05D 1/00 (2006.01)

(52) U.S. Cl.
CPC ............ *G06Q 10/083* (2013.01); *G05D 1/0088* (2013.01); *G05D 1/0212* (2013.01); *G05D 1/028* (2013.01); *G05D 1/0242* (2013.01); *G05D 1/0272* (2013.01); *G05D 1/0278* (2013.01); *G05D 1/0285* (2013.01); *G05D 2201/0211* (2013.01); *G05D 2201/0216* (2013.01); *Y10S 901/01* (2013.01)

(58) Field of Classification Search
CPC ....... G06Q 50/28; G06Q 20/24; G06Q 10/83; B07C 3/082; B07C 3/00; G05D 1/0212; G05D 1/0088; G05D 1/0272; G05D 1/028; G05D 1/0242; G05D 1/0278; G05D 1/0285; G05D 2201/0216; G05D 2201/0211; Y10S 901/01
USPC .......................................................... 705/39
See application file for complete search history.

(56) References Cited

U.S. PATENT DOCUMENTS

| | | | | |
|---|---|---|---|---|
| 5,931,262 A * | 8/1999 | Greenlaw | ................ | B60P 1/02 187/235 |
| 6,328,525 B1 * | 12/2001 | Greenlaw | ................ | B60P 1/02 187/244 |
| 6,408,243 B1 * | 6/2002 | Yofu | ...................... | G08G 1/202 701/420 |
| 7,047,888 B2 * | 5/2006 | Richards | ................ | B61B 15/00 104/27 |
| 7,197,376 B2 * | 3/2007 | Berdelle-Hilge | ......... | B07C 1/00 700/225 |
| 7,609,156 B2 * | 10/2009 | Mullen | .................. | F41G 3/147 2/455 |
| 7,818,090 B2 * | 10/2010 | Okamoto | ............. | G05D 1/0272 700/253 |
| 7,894,939 B2 * | 2/2011 | Zini et al. | ...................... | 700/245 |
| 7,912,633 B1 * | 3/2011 | Dietsch | .................. | G01C 21/20 701/450 |

(Continued)

OTHER PUBLICATIONS

Packer, A. (Jun. 17, 2012). Driverless cars inching closer to reality. Las Vegas Review—Journal Retrieved from http://search.proquest.com/docview/1020944949?accountid=14753 on Sep. 28, 2015.*

(Continued)

*Primary Examiner* — Kito R Robinson
(74) *Attorney, Agent, or Firm* — Johnson, Marcou & Isaacs, LLC

(57) ABSTRACT

Package delivery platform. An autonomous road vehicle is operative to receive destination information, and to drive to a destination based on the destination information. A package securing subsystem is attached to the autonomous road vehicle and comprises at least one securable compartment. Each securable compartment is operative to secure at least one package therein. Each securable compartment is associated with compartment access information. An access subsystem comprising at least one access information interface. The access subsystem is operative, upon receipt through the access information interface of compartment access information, to permit access to the compartment associated with the received compartment access information.

18 Claims, 9 Drawing Sheets

(56) References Cited

U.S. PATENT DOCUMENTS

| | | | |
|---|---|---|---|
| 7,991,505 B2* | 8/2011 | Lert, Jr. | B65G 1/0492 198/347.1 |
| 8,306,833 B2* | 11/2012 | Hurpin | E04H 6/14 705/13 |
| 8,736,820 B2* | 5/2014 | Choe | G05D 1/024 356/3.01 |
| 2002/0052688 A1* | 5/2002 | Yofu | G08G 1/202 701/420 |
| 2004/0035315 A1* | 2/2004 | Richards | B61B 15/00 104/124 |
| 2006/0053534 A1* | 3/2006 | Mullen | F41G 3/147 2/456 |
| 2006/0293892 A1* | 12/2006 | Pathuel | G10L 17/00 704/246 |
| 2008/0009984 A1* | 1/2008 | Lee | G05D 1/0225 701/23 |
| 2008/0109246 A1* | 5/2008 | Russell | G06Q 10/04 705/1.1 |
| 2009/0043440 A1* | 2/2009 | Matsukawa | G05D 1/0214 701/25 |
| 2009/0313095 A1* | 12/2009 | Hurpin | E04H 6/14 705/13 |
| 2010/0057341 A1* | 3/2010 | Bradburn | G01C 21/3415 701/533 |
| 2010/0082491 A1* | 4/2010 | Rosenblatt | G06Q 10/02 705/65 |
| 2010/0222925 A1* | 9/2010 | Anezaki | G05D 1/0221 700/253 |
| 2010/0234990 A1* | 9/2010 | Zini | G05B 19/41895 700/245 |
| 2010/0256852 A1* | 10/2010 | Mudalige | G08G 1/22 701/24 |
| 2011/0125323 A1* | 5/2011 | Gutmann | G05D 1/0234 700/258 |
| 2011/0166707 A1* | 7/2011 | Romanov | G01S 5/16 700/255 |
| 2014/0022051 A1* | 1/2014 | Levien | A61M 5/20 340/5.2 |
| 2014/0025230 A1* | 1/2014 | Levien | A61M 5/20 701/2 |
| 2014/0032034 A1* | 1/2014 | Raptopoulos | G08G 5/0069 701/25 |
| 2014/0081445 A1* | 3/2014 | Villamar | G05D 1/02 700/216 |
| 2014/0180914 A1* | 6/2014 | Abhyanker | G01C 1/00 705/39 |
| 2014/0277900 A1* | 9/2014 | Abhyanker | G05D 1/021 701/25 |
| 2014/0330456 A1* | 11/2014 | Lopez Morales | G06Q 10/08355 701/3 |
| 2015/0185034 A1* | 7/2015 | Abhyanker | G01C 21/3453 701/23 |
| 2015/0202770 A1* | 7/2015 | Patron | B25J 9/0003 700/245 |

OTHER PUBLICATIONS

GPS precision: From north of the border. (2002). Satellite News, 25(22), 1. Retrieved from http://search.proquest.com/docview/222193756?accountid=14753 on Sep 28, 2015.*

* cited by examiner

AUTONOMOUS DELIVERY PLATFORM

FIELD OF THE TECHNOLOGY

The disclosed technology relates to delivery systems. Example embodiments relate to autonomously driven delivery platforms, systems, and methods.

BACKGROUND

Delivery services (also known as courier services, mail services, and shipping services), such as those offered by the U.S. Postal Service and commercial carriers provide delivery and pickup of letters, packages, and parcels (hereinafter referred to as "packages") to and from residences and businesses across the country. Typically, such services operate in hub and spoke architecture.

A typical nationwide or international delivery service maintains a large fleet of vehicles. Such vehicles include airplanes and semi-trailer trucks to move packages between hubs and spokes, and smaller vehicles for the "last mile" from spoke endpoints to delivery destinations (for example a home or business). Between them, the two largest commercial delivery services in the U.S. operate over 100,000 last mile vehicles—each of which requires a human operator. In some situations, some interaction with a person at pickup or delivery is desired, for example for proof of delivery, for payment on delivery (also known as "cash on delivery" or "COD"), or payment of delivery costs on pickup. The growth of business-to-consumer e-commerce, online shopping for example, is expected to continue to increase the demand for delivery services, and hence the need for capacity and efficiency in the last mile.

SUMMARY

Figure 1:
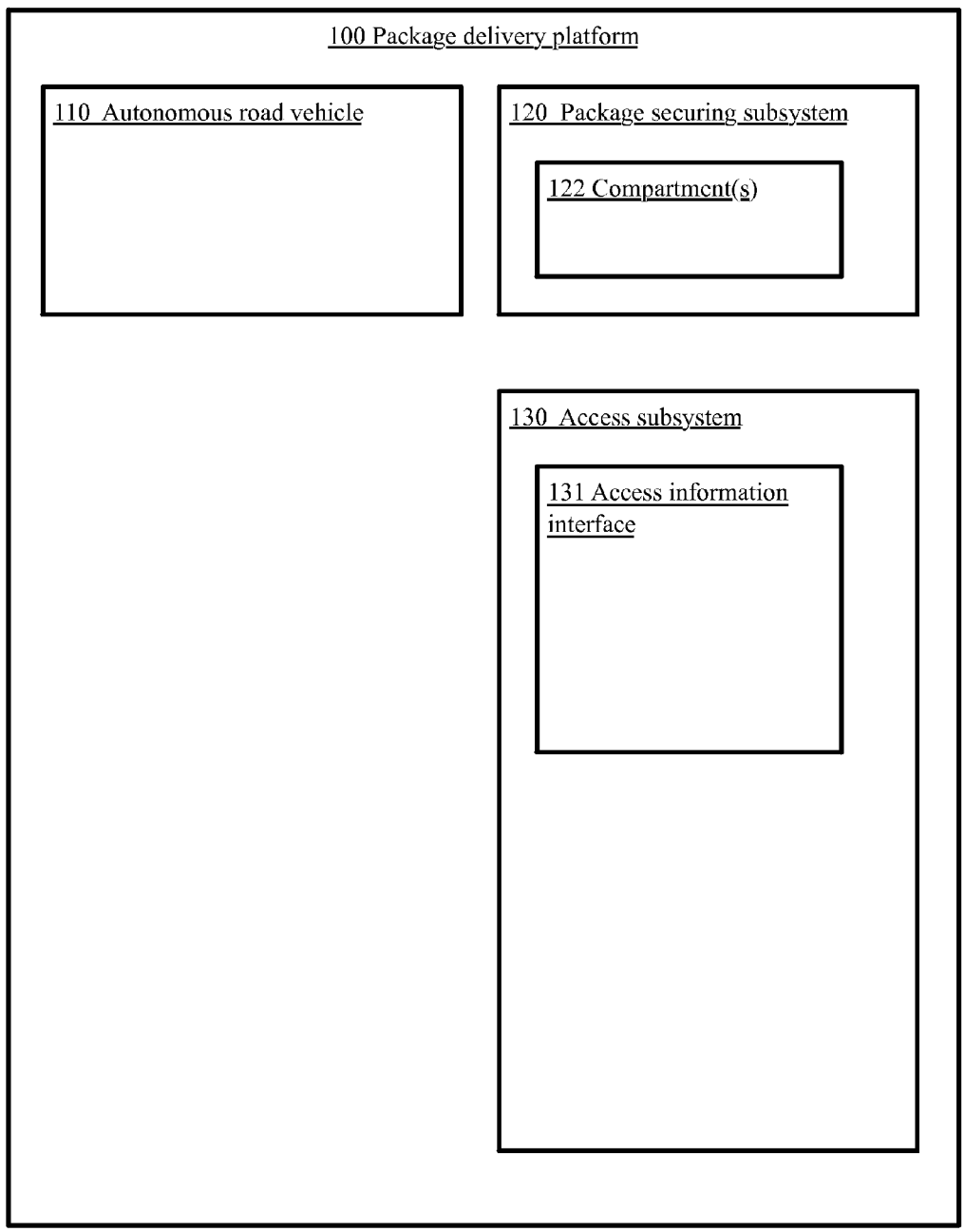
FIG. 1 is a diagram depicting a package delivery platform, in accordance with certain example embodiments of the present technology.

The technology includes methods, computer program products, and systems for autonomous delivery of packages. A package delivery platform includes an autonomous road vehicle, a package securing subsystem, and an access subsystem. The autonomous road vehicle is operative to receive destination information, and to drive to a destination based on the destination information. The package securing subsystem is attached to the autonomous road vehicle. The package securing subsystem includes at least one securable compartment. Each securable compartment is operative to secure at least one package therein. Each securable compartment can be associated with compartment access information. The access subsystem comprising at least one access information interface. The access subsystem is operative, upon receipt through the access information interface of compartment access information, to permit access to the compartment associated with the received compartment access information.

In some embodiments, the compartment access information is a personal identification number (PIN), and the access subsystem includes a PIN pad for receiving a PIN as a component of the compartment access information. In some such embodiments, the package delivery platform includes a positioning system that is operative to determine the location of the package delivery platform. In those embodiments, the access information includes a first location, and the access subsystem is operative to permit access to each compartment upon receiving the PIN at a determined location corresponding to the first location.

In some embodiments, the compartment access information includes a payment amount. In such embodiments, the access subsystem includes a payment subsystem operative to receive payment information. Such an access subsystem can permit access to a compartment upon receiving at least payment information corresponding to the payment amount. In some such embodiments, the payment subsystem includes a payment card reader for receiving payment information.

In some embodiments, the destination information can be dynamically updated. In some such embodiments, the destination information is dynamically updated based at least in part on the reported location of a mobile communication device associated with the access information.

In some embodiments, the access information includes information communicable via near field communication (NFC). In such embodiments, the access subsystem includes at least one of a Near Field Communication (NFC) initiator and an NFC target for receiving access information communicable via NFC.

These and other aspects, objects, features, and advantages of the example embodiments will become apparent to those having ordinary skill in the art upon consideration of the following detailed description of illustrated example embodiments.

DETAILED DESCRIPTION

Overview

Embodiments of the present technology include autonomously driven delivery platforms, systems of autonomously driven delivery platforms, and methods of delivery services using such platforms and systems. While embodiments herein are disclosed in the context of package services, the technology can be used for all types of delivery, such as advertising circulars, and direct-from-merchant goods (for example pizza delivery).

As an example use case, consider a delivery service tasked to deliver a package to an addressee. An autonomous delivery platform that is scheduled to deliver packages near a delivery location of the addressee can be chosen. A package securing subsystem of the chosen autonomous delivery platform can include a plurality of compartments. A compartment on board the autonomous delivery platform can be reserved and the package placed in it. The autonomous delivery platform can include an access subsystem using a unique Personal Identification Number (PIN) code assigned to this compartment for this delivery and this addressee. In some embodiments, the compartment can be secured to be open using a credit card of the addressee, or a near field communication (NFC) identifier of the addressee's mobile communication device. The PIN code can be sent to the addressee by text message, along with an estimated arrival time of the autonomous delivery platform at the delivery location. If needed, the addressee can share the PIN code with family members or whoever will be authorized to receive the package on the addressee's behalf The autonomous delivery platform's communication subsystem can send a text message to the recipient shortly before it is to arrive at the delivery address, and when the vehicle is at the address, another message can be sent indicating that the package is ready for pickup. The addressee (or someone authorized to receive the package on behalf of the addressee) may enter the PIN code through an access information interface on the autonomous delivery platform. On entry of the proper PIN code, the platform's access subsystem can permit access to the compartment.

Turning now to the drawings, in which like numerals represent like (but not necessarily identical) elements throughout the figures, example embodiments of the present technology are described in detail.

Example System Architectures

Referring to FIG. 1, an example architecture for a delivery platform 100 is illustrated. In such an architecture, the delivery platform 100 includes an autonomous road vehicle 110. An autonomous vehicle is a motor vehicle that may use artificial intelligence, sensors and location/positioning technology to drive itself without the active intervention of a human operator. Some autonomous road vehicles have completed over 300,000 miles of testing over a wide range of traffic conditions without a single accident under autonomous operation. Automated road vehicles can use various sensors, for example, video cameras, radar sensors and laser range finders, to "see" other traffic, as well as detailed maps to navigate a road, and a communication subsystem, such as a wireless communication subsystem, to communicate with a controller and other entities.

The autonomous road vehicle 110 can be operative to receive destination information, and to drive to one or more destinations based on the destination information. Embodiments of a system of the technology, described elsewhere herein, can transmit the destinations and an optimized route to the autonomous road vehicle 110 via the communication subsystem of the autonomous road vehicle 110. In some embodiments, the autonomous road vehicle 110 can determine the route.

Figure 5:
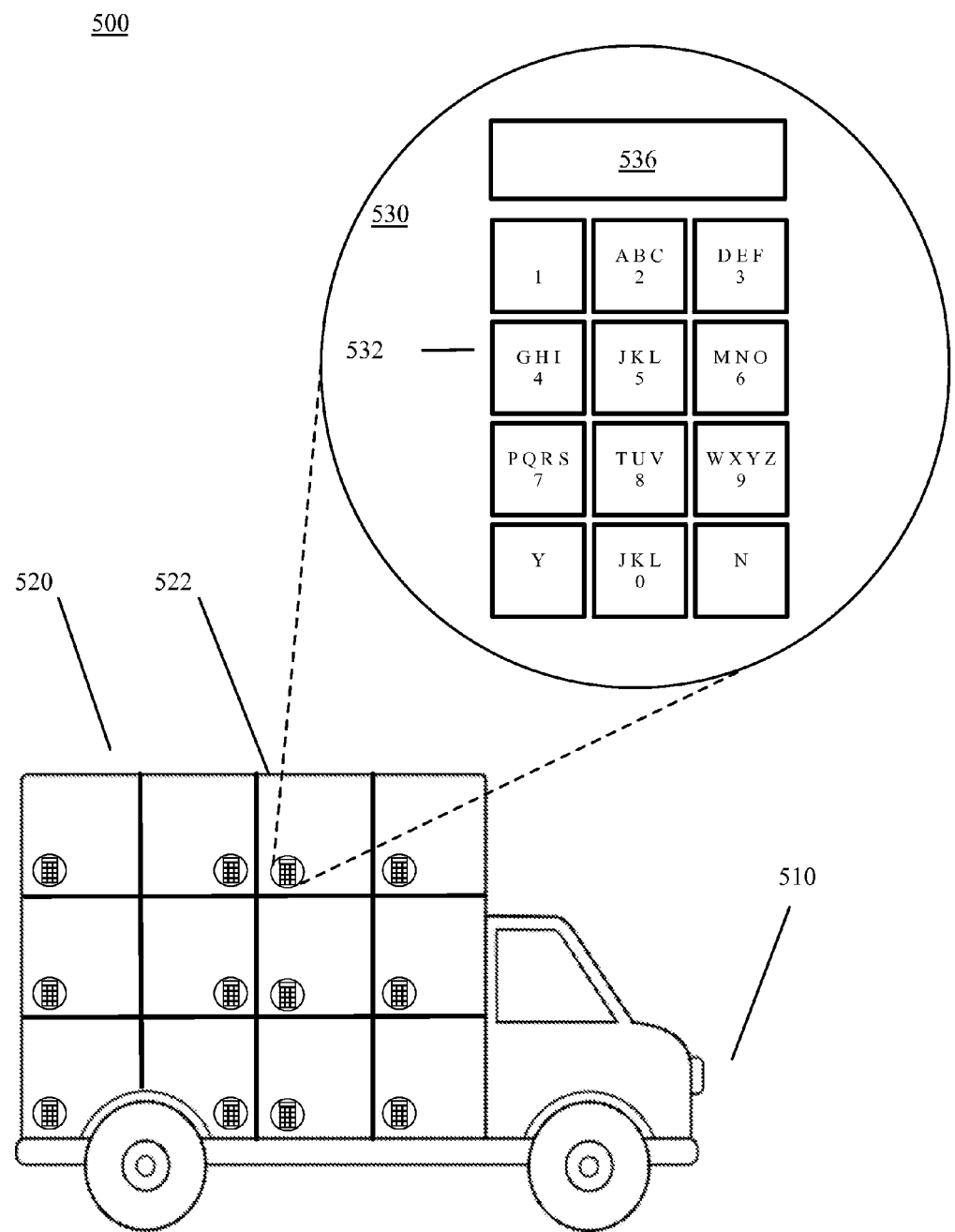
FIG. 5 is a diagram depicting a package delivery platform, in accordance with certain example embodiments of the present technology.
Figure 6:
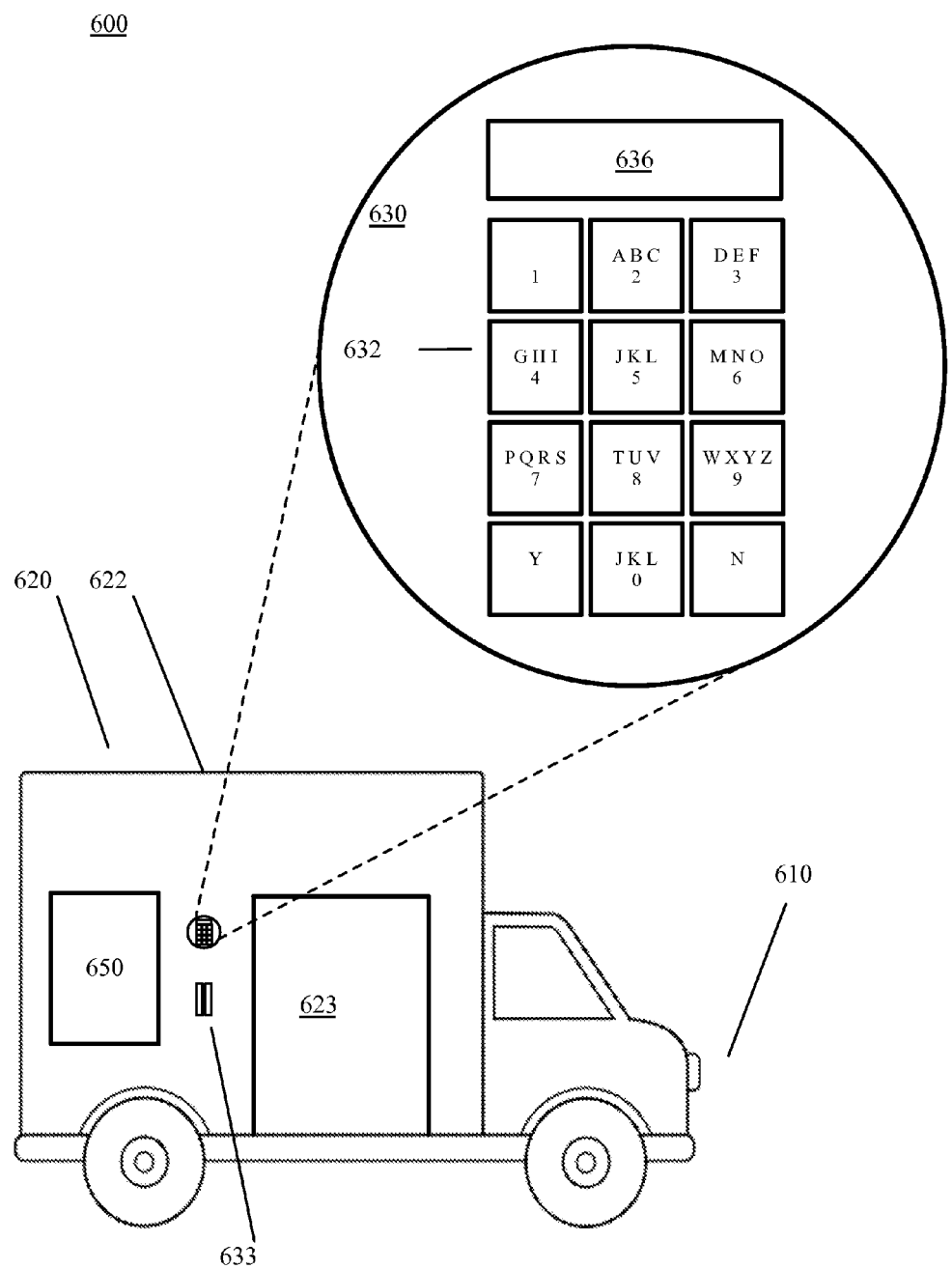
FIG. 6 is a diagram depicting a package delivery platform, in accordance with certain example embodiments of the present technology.

As shown in FIG. 5 as 510 and in FIG. 6 as 610, the autonomous road vehicle 110 can be what is known as a box truck. Other types of road vehicles can be used in embodiments of the present technology, including but not limited to cargo vans, minivans, pickup trucks, panel vans, platform trucks, flatbed trucks, refrigerated trucks, tank trucks, and semi-trailer trucks, cars. Internal combustion engines, electric engines, and hybrid systems can power such vehicles. An autonomous box truck will be used in the examples herein.

As a continuing example, consider that an autonomous box truck can receive package pickup/delivery destination (referred to hereinafter as an "exchange destination") information for three exchange destinations, including a route from a package depot to each of the destinations in turn, and then a return to the depot.

Returning to FIG. 1, a package securing subsystem 120 can be attached to the autonomous road vehicle 110. The package securing subsystem can include one or more securable compartments 122. Each securable compartment 122 can secure at least one package therein. For example, FIG. 5 illustrates a delivery platform 500 including a box truck autonomous road vehicle 510 with a package securing subsystem 520 attached thereto. Package securing subsystem 520 includes a plurality of securable compartments 522. While the package securing subsystem 520 of FIG. 5 is shown as comprising a plurality of substantially equal-sized compartments, other arrangements can be used, for example to accommodate packages of different sizes. In some embodiments, a compartment such as 522 can include a plurality of sub-compartments, for example an array of smaller compartments sized to accommodate letters or publications.

In the continuing example, a first package corresponding to a first exchange destination can be secured in a first securable compartment of the autonomous box truck, and a plurality of packages corresponding to a second exchange destination can be secured in a second securable compartment of the autonomous box truck. A third securable compartment of the autonomous box truck remains empty in anticipation of receiving a package at the third destination.

Returning to FIG. 1, access to one or more securable compartments 122 of a package securing subsystem 120 can be controlled through an access subsystem 130. The access subsystem 130 can include an access information interface 131. Upon receipt through the access information interface 131 of compartment access information, the access subsystem 130 can permit access to the compartment associated with the received compartment access information.

Figure 2:
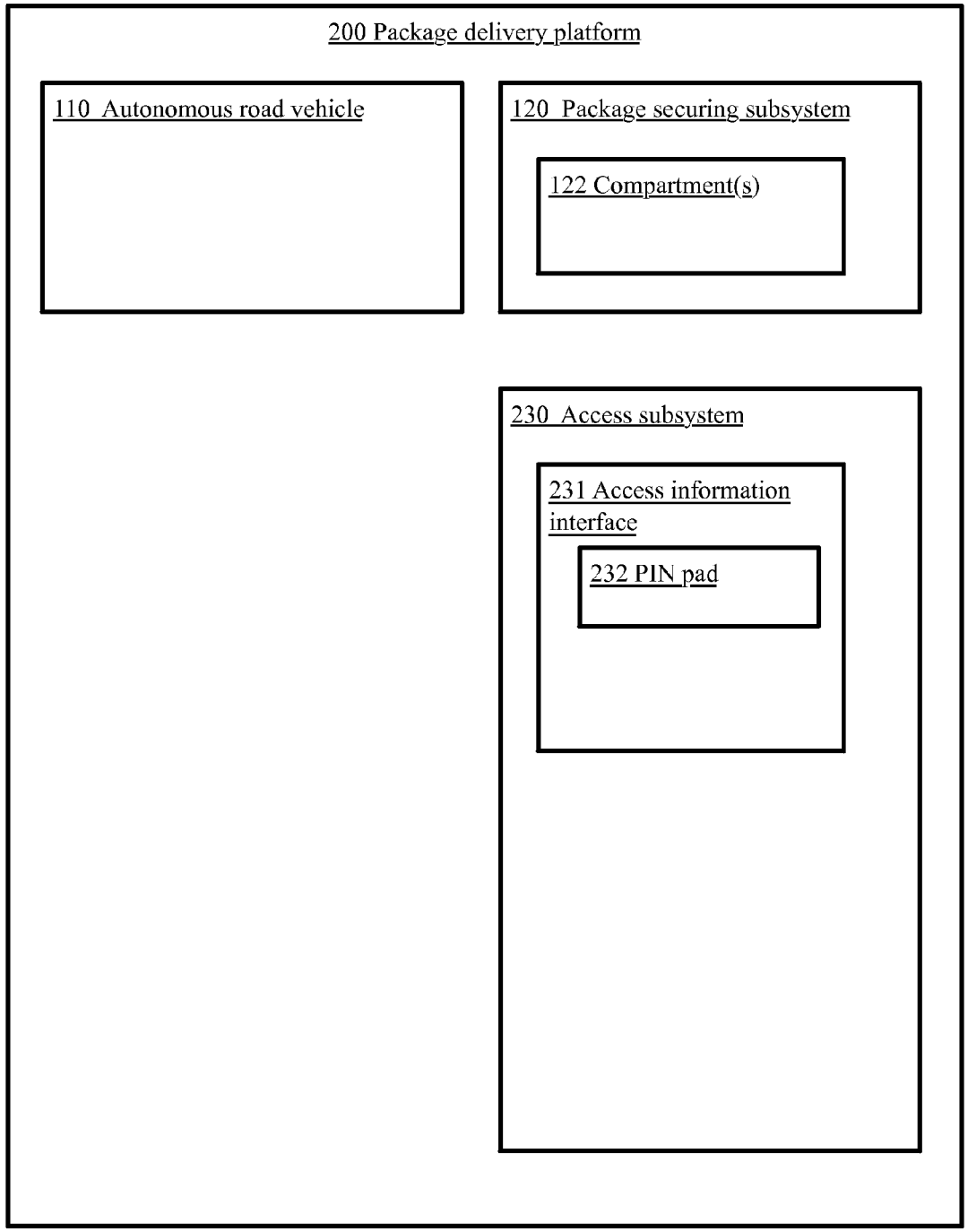
FIG. 2 is a diagram depicting a package delivery platform, in accordance with certain example embodiments of the present technology.

Referring to FIG. 2, and continuing to refer to prior figures for context, delivery platform 200 is illustrated. Autonomous road vehicle 110 and Package securing subsystem 120 are described elsewhere herein. In such a platform 200, access subsystem 230 includes an alphanumeric keypad 232 as part of the access information interface 231. The alphanumeric keypad 232 can be used for entering compartment access information.

Referring again to the delivery platform 500 of FIG. 5, a separate access subsystem, e.g., access subsystem 530, is shown for each securable compartment, e.g., securable compartment 522. The visible portion of access subsystem 530 can include a keypad 532 and a display window 536. Additional portions of the access subsystem 530 can be integrated into the door of securable compartment 522.

In some embodiments of the technology, a single access subsystem can be is shared by a plurality of compartments. When the recipient enters a PIN code or swipes a credit card, one or more compartments associated with the access subsystem unlock and the display window in the access subsystem shows the compartment number(s) so the recipient knows which compartment(s) to access. For example, access to all compartments on the curbside of a package delivery platform can be under the control of an access subsystem on the curbside of the package delivery platform, while access to compartments on the rear of the package delivery platform can be under the control of an access subsystem on the rear of the package delivery platform.

Embodiments of a system of the technology, described elsewhere herein, can transmit access information for each of the first, second, and third compartments to the autonomous road vehicle via the communication subsystem of the autonomous road vehicle. In some embodiments, an access subsystem 130, 230, 530 can include a near field communication reader, a radio frequency identification (RFID) interrogator, or other such sensor that can be used to authorize access to one or more securable compartments 122, 522. Access to multiple securable compartments can be provided under a set of single access information, for example, if multiple packages intended for the same addressee do not fit into a single compartment, a single PIN can be used to control access multiple compartments.

In the continuing example, the autonomous box truck includes a Personal Identification Number (PIN) pad and a display window interface. A first PIN to permit access to the compartment containing the first package can be sent, for example by e-mail, to the addressee of the first package. A second PIN to permit access to the plurality of packages in the second securable compartment can be sent, for example, by short message service (SMS) to the addressee of the plurality of packages in the second securable compartment. Further, a third PIN code to permit access to a third compartment can be sent to a native application executing on a mobile computing device of a third user to allow the third user to add a package to the third compartment.

For each exchange destination, a time window during which the package delivery platform is schedule to arrive at the exchange destination can be communicated to the respective addressee, for example, in the same fashion as PINs are communicated to the addressees. Any revisions to the scheduled arrival time for a destination, for example due to traffic, can be transmitted to the addressee in a similar fashion. Each arrival time can be communicated to the appropriate addressee by the delivery platform 100 using its communication subsystem, or by server of the system housed off platform.

In the continuing example, the technology sends "12:00 p.m. today" as an arrival time to the addressee of the first package via e-mail, "1:00 p.m. today" as an arrival time to the addressee of the second package as an SMS message, and displays an arrival time of "2:00 p.m. today" in a window of a web browser on computing device of the third addressee.

Figure 3:
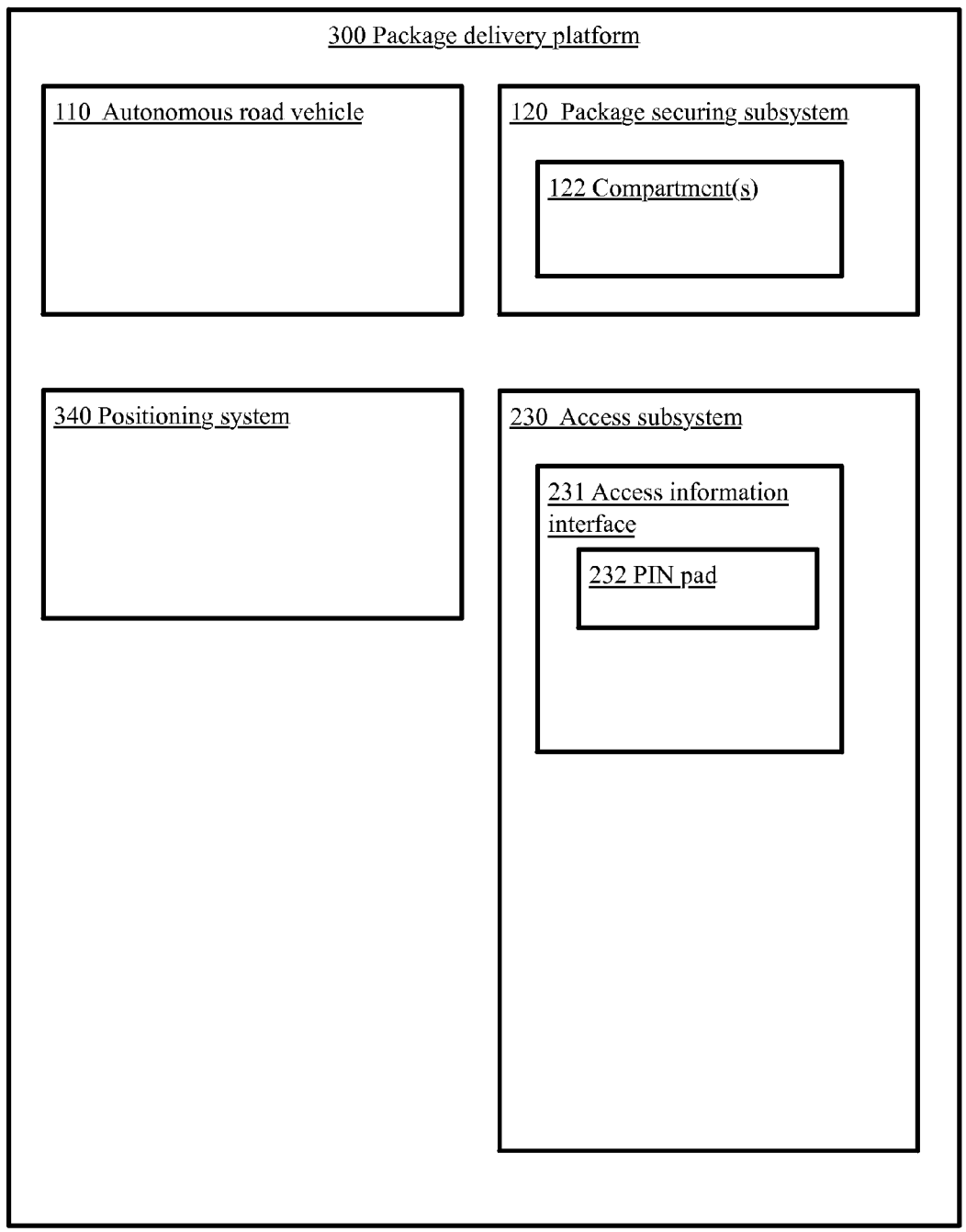
FIG. 3 is a diagram depicting a package delivery platform, in accordance with certain example embodiments of the present technology.

Referring to FIG. 3, and continuing to refer to prior figures for context, delivery platform 300 is illustrated. Autonomous road vehicle 110, package securing subsystem 120, and access subsystem 230 are described elsewhere herein. Such a platform 300 can also include a navigation system 340. Navigation system 340 can determine the position of the delivery platform 300, enabling it to follow a route among the exchange destinations and back to the depot, and in some embodiments, enabling delivery platform 300 to determine its own route among exchange destinations. Upon arrival at each destination, the autonomous road vehicle 110 can remain at the destination for a period ("dwell period") that can be predetermined, or dynamically determined. In each case, determination of the period can be based on factors such as the value of the package, weather conditions, and the nature of the destination, history of interaction with the addressee, and addressee preferences. The dwell period can be extendable, with an arrival notification sent to the intended addressee (in a manner similar to that for ending the PIN) upon arrival, and a reminder sent at the beginning of each extension, with the remaining dwell period included in the notification. In some embodiments of the present technology, the delivery platform 300 can disable PIN input via the access subsystem 230 access to a compartment when the delivery platform is not at a depot or at the exchange destination for that compartment.

In the continuing example, the autonomous box truck can use the received exchange destination information (including the predetermined route) and the current position of the box truck to travel the route among the three exchange destinations, stopping first at the first exchange destination and dwelling for a period. Upon arrival at the first exchange destination at the scheduled arrival time for that destination, the autonomous box truck can dwell for a predetermined period of five (5) minutes. A text window of the access control interface can display the message "arrived at the exchange destination for this compartment, please enter the PIN for this compartment." Upon receiving an entry of the PIN from an authorized recipient of the addressee via the PIN keypad, the access control subsystem permits access to the first compartment, and the authorized recipient may retrieve the package from the open compartment.

Figure 4:
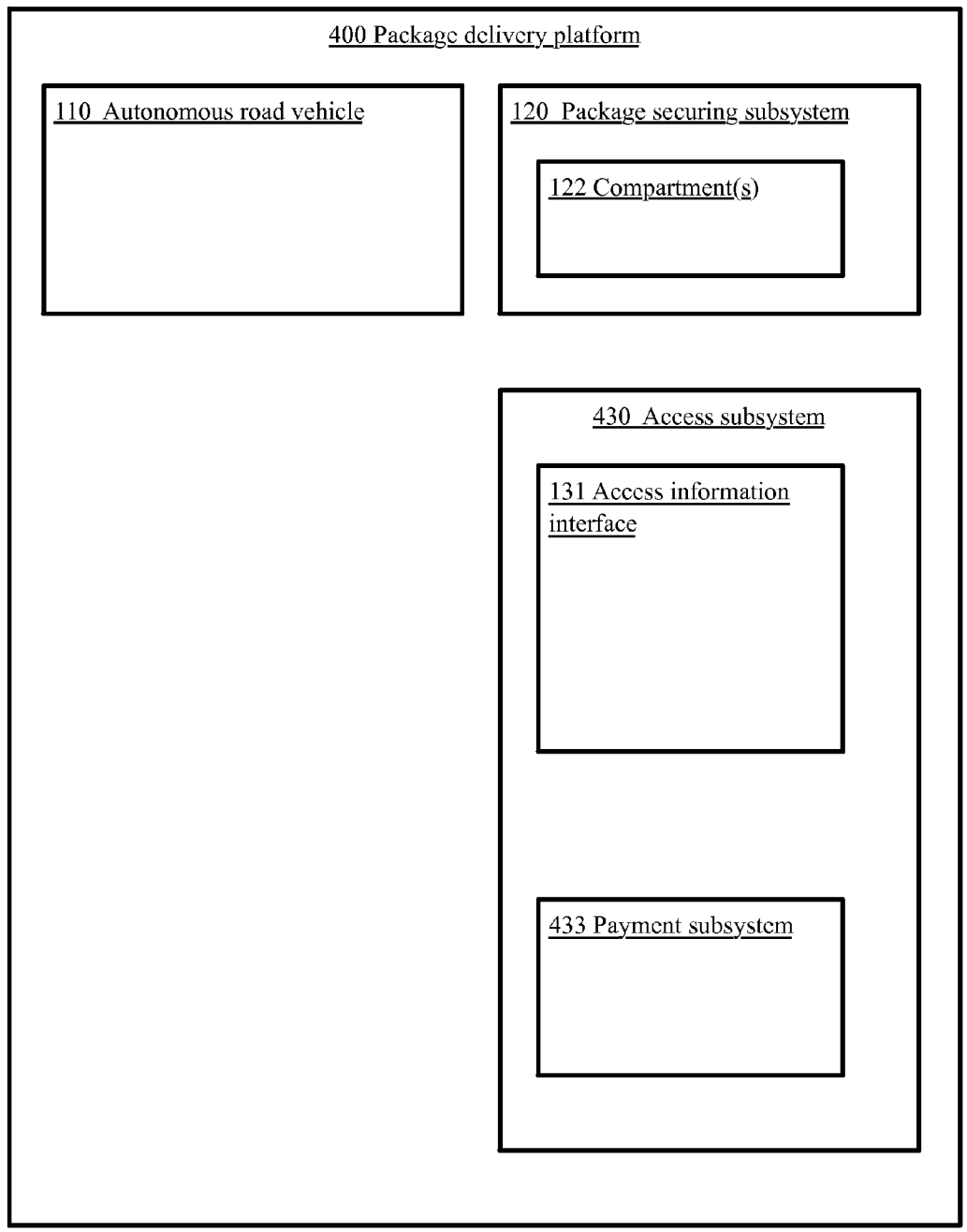
FIG. 4 is a diagram depicting a package delivery platform, in accordance with certain example embodiments of the present technology.

Referring to FIG. 4, and continuing to refer to prior figures for context, delivery platform 400 is illustrated. Autonomous road vehicle 110, package securing subsystem 120, and access information interface 131 are described elsewhere herein. In such a platform 400, the access subsystem 430 can also include an access payment system 433, such as a credit card reader, an NFC device, or an RFID interrogator.

In the continuing example, after making the delivery to the first exchange location, the autonomous box truck is routed to the second location, but encounters heavy traffic. When the estimated arrival time for the second exchange location is later than 2:00, a delivery system server (shown in FIG. 7) can send an SMS message to the second addressee revising the second exchange destination arrival time to 2:15. Upon arrival of the autonomous box truck at the second exchange destination at 2:14, the access interface system displays a message indicating that a COD payment is required to access the compartment containing the second set of packages. The autonomous box truck begins a dwell period that lasts until 2:25—10 minutes past the revised scheduled arrival time. At 2:25 the autonomous box truck sends an SMS message and an e-mail message to the second addressee extending the dwell period until 2:30. At 2:28, the second addressee arrives, and in response to COD payment message, slides a credit card through a credit card reader on the door of the compartment containing the packages intended for the second addressee (thereby providing payment information), and using the PIN keypad, enters the PIN code provided to the second addressee earlier. The access control subsystem then allows access to the compartment containing the packages intended for the second addressee.

Figure 7:
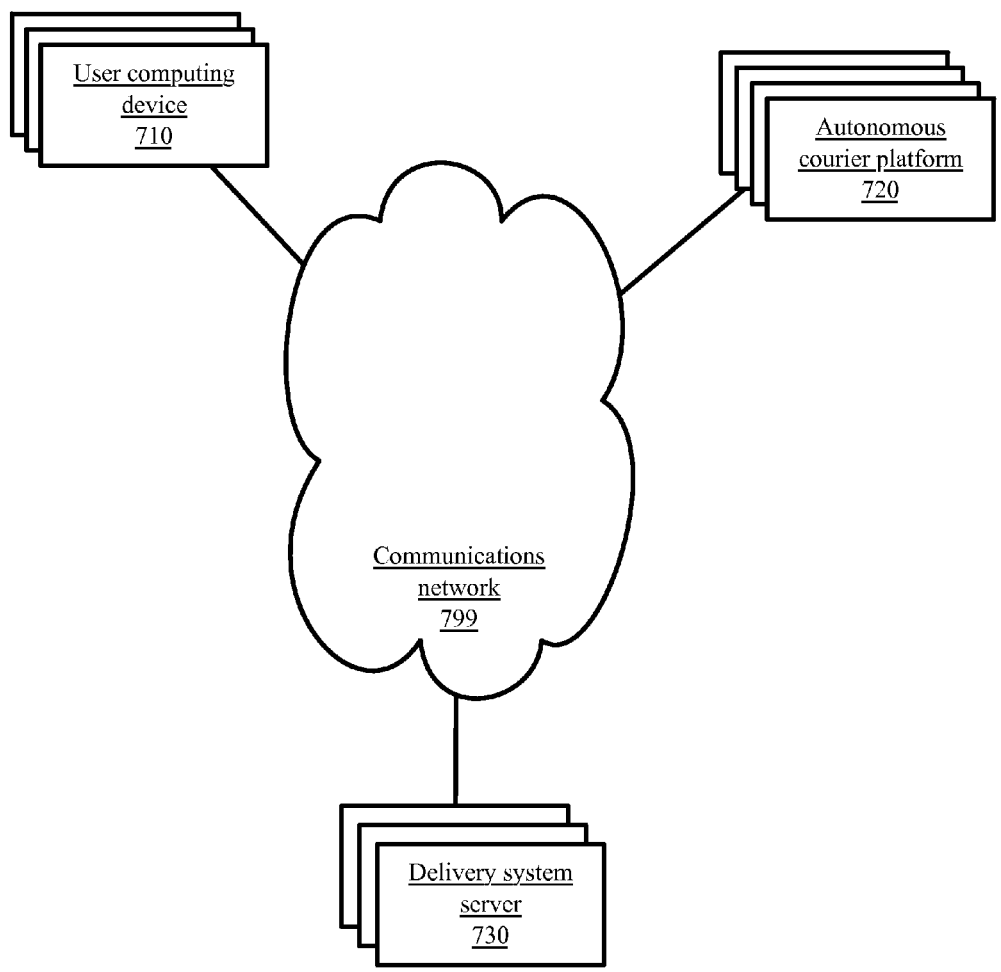
FIG. 7 is a diagram depicting a communications and processing architecture of a package delivery system, in accordance with certain example embodiments.

FIG. 7 is a diagram of an architecture 700 for example embodiments of the technology disclosed herein. As depicted in FIG. 7, the architecture 700 includes network devices 710, 720, and 730; each of which may be configured to communicate with one another via communications network 799. In some embodiments, a user associated with a device must install an application and/or make a feature selection to obtain the benefits of the techniques described herein.

Network 799 includes one or more wired or wireless telecommunications means by which network devices may exchange data. For example, the network 799 may include one or more of a local area network (LAN), a wide area network (WAN), an intranet, an Internet, a storage area network (SAN), a personal area network (PAN), a metropolitan area network (MAN), a wireless local area network (WLAN), a virtual private network (VPN), a cellular or other mobile communication network, a BLUETOOTH® wireless technology connection, a near field communication (NFC) connection, any combination thereof, and any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer-based environment.

Each network device can include a communication module capable of transmitting and receiving data over the network 799. For example, each network device can include a server, a desktop computer, a laptop computer, a tablet computer, a television with one or more processors embedded therein and/or coupled thereto, a smart phone, a handheld computer, a personal digital assistant (PDA), or any other wired or wireless processor-driven device. In the example embodiment depicted in FIG. 1, a user may operate the network device 710, and delivery system operator may operate network devices 720 and 730. Network device 730 can be one or more instances of a delivery service server coordinating the operation of one or more autonomously driven delivery platforms described herein, by assigning compartments and access information, transmitting access information to addressees, determining routes, receiving status reports, and the like.

The network connections illustrated are example and other means of establishing a communications link between the computers and devices can be used. Moreover, those having ordinary skill in the art having the benefit of the present disclosure will appreciate that the network devices illustrated in FIG. 7 may have any of several other suitable computer system configurations. For example, a user computer device 710 may be embodied as a mobile phone or handheld computer may not include all the components described above.

Example Methods

The example methods illustrated in the following figures are described hereinafter with respect to the components of the example operating environment and example architecture described elsewhere herein. The example methods may also be performed with other systems and in other environments.

Figure 8:
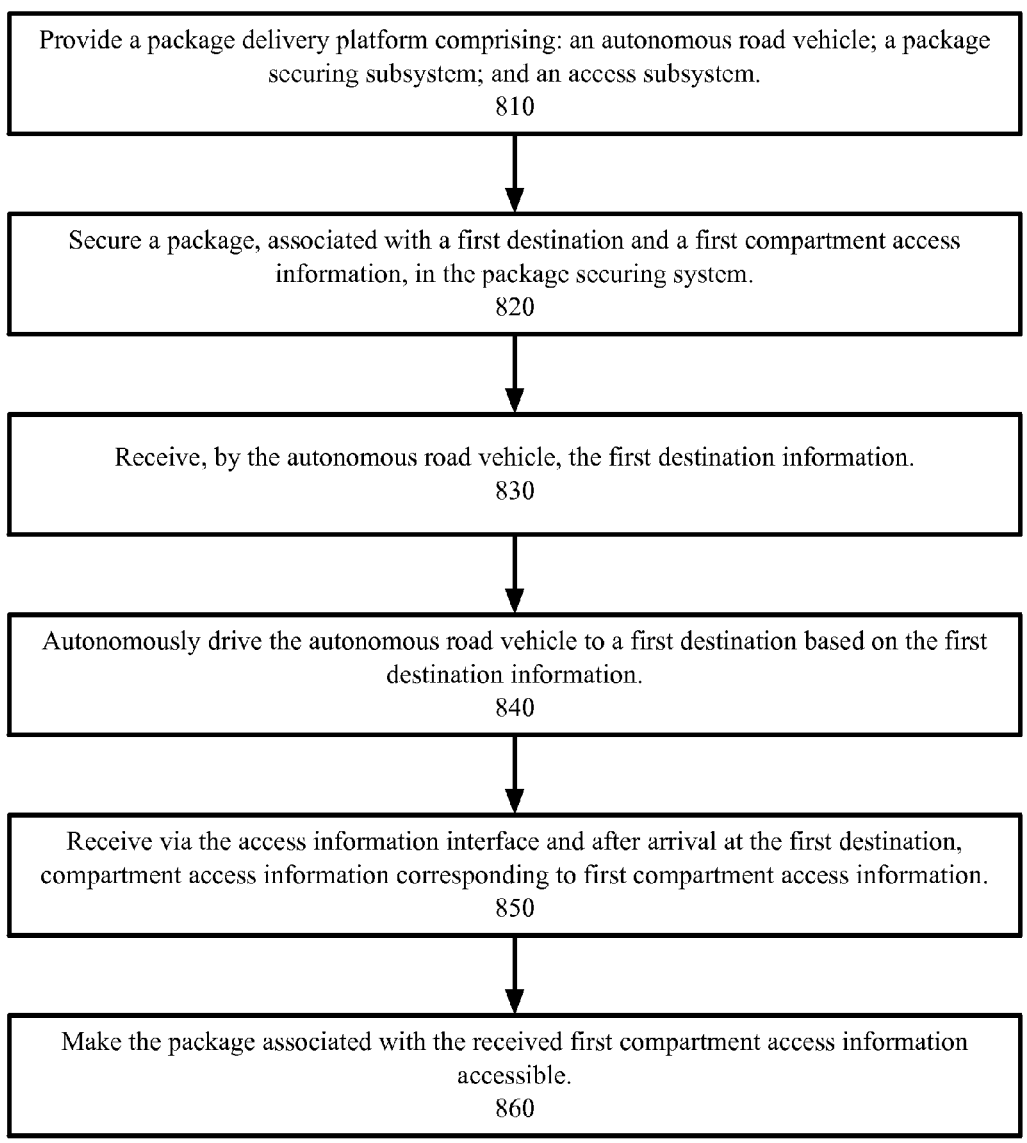
FIG. 8 is a diagram depicting methods for package delivery, in accordance with certain example embodiments of the present technology

Referring to FIG. 8, and continuing to refer to prior figures for context, processes 800 for package delivery are illustrated. In such processes a package delivery platform including an autonomous road vehicle, a package securing subsystem, and an access subsystem can be provided—Block 810. The autonomous road vehicle is operative to receive destination information, and to drive to a destination based on the destination information. The package securing subsystem is attached to the autonomous road vehicle. The package securing subsystem can include at least one securable compartment. Each securable compartment can be operative to secure at least one package therein. Each securable compartment can be associated with compartment access information. The access subsystem can include at least one access information interface. The access subsystem can be operative, upon receipt through the access information interface of compartment access information, to permit access to the compartment associated with the received compartment access information.

One or more packages associated with a first destination and first compartment access information can be secured in a first securable compartment of the package delivery platform—Block 820. The autonomous road vehicle can receive first destination information—Block 830. The autonomous vehicle can autonomously drive to the first destination based on the received first destination information—Block 840. After arrival at the first destination, the package delivery platform can receive first compartment access information via the access information interface—Block 850. Upon receiving first compartment access information via the access information interface, the access subsystem can make the package associated with the received first compartment access information available—Block 860.

Other Example Embodiments

As another example, FIG. 6 illustrates a delivery platform 600 including a box truck autonomous road vehicle 610 with a package securing subsystem 620 attached thereto. Package securing subsystem 820 includes a single securable compartment 622. The single securable compartment 622 includes an access door 623. Courier platform 600 can thus be configured akin to a vending machine, such that a package can be dispensed therefrom, or accepted into, the single securable compartment 622 through access door 623. For example, using an access subsystem 630 (described elsewhere herein) and payment card reader 633, a user can view products through window 650, and select a product using keypad 632, pay for the selected product using card reader 633. The platform 600 can then make the selected paid product available through door 623 using material handling systems familiar to those of skill in the art.

In some embodiments, the autonomous delivery platform can change its route based on a signal from a mobile communication device of an addressee. In such a "follow me" mode, the addressee can indicate that the package be delivered to the addressee's present location—for example the recipient's office.

Figure 9:
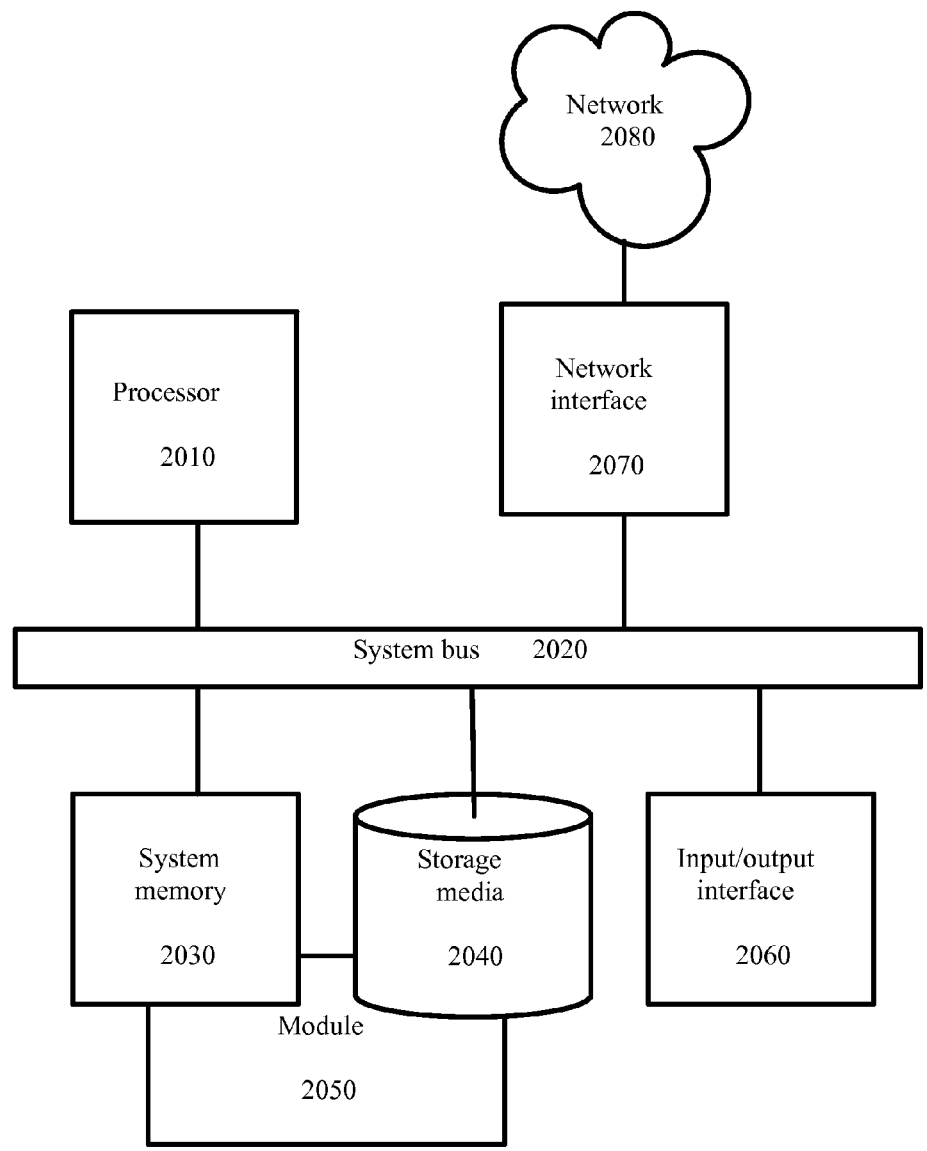
FIG. 9 is a block diagram depicting a computing machine and a module, in accordance with certain example embodiments.

FIG. 9 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components, for example, a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor (DSP), an application specific integrated circuit (ASIC), a graphics processing unit (GPU), a field programmable gate array (FPGA), a programmable logic device (PLD), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories, for example, read-only memory (ROM), programmable read-only memory (PROM), erasable programmable read-only memory (EPROM), flash memory, or any other device capable of storing program instructions or data with or without applied power. The system memory 2030 may also include volatile memories, for example, random access memory (RAM), static random access memory (SRAM), dynamic random access memory (DRAM), and synchronous dynamic random access memory (SDRAM). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device, for example, the storage media 2040.

The storage media 2040 may include a hard disk, a floppy disk, a compact disc read only memory (CD-ROM), a digital versatile disc (DVD), a Blu-ray disc, a magnetic tape, a flash memory, other non-volatile memory device, a solid sate drive (SSD), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules, for example, module 2050, data, or any other information. The storage media 2040 may be part of, or connected to, the computing machine 2000. The storage media 2040 may also be part of one or more other computing machines that are in communication with the computing machine 2000, for example, servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits, for example, microcode or configuration information for an FPGA or other PLD.

The input/output (I/O) interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, for example, small computer system interface (SCSI), serial-attached SCSI (SAS), fiber channel, peripheral component interconnect (PCI), PCI express (PCIe), serial bus, parallel bus, advanced technology attached (ATA), serial ATA (SATA), universal serial bus (USB), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media, for example, fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device, for example, a system on chip (SOC), system on package (SOP), or ASIC device.

In situations in which the technology discussed here collects personal information about users, or may make use of personal information, the users may be provided with a opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (, for example, to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the technology described herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

We claim:

1. A package delivery platform, comprising:
    an autonomous road vehicle operative to receive a first destination and to drive toward the first destination;
    a package securing subsystem attached to the autonomous road vehicle and comprising at least one securable compartment, each securable compartment operative to secure at least one package therein, each securable compartment associated with corresponding compartment access information;
    a positioning system operative to determine a location of the package delivery platform; and
    an access subsystem comprising at least one access information interface and operative, upon both (a) the determined location of the package delivery platform matching a most current received destination and (b) receipt through the at least one access information interface of compartment access information, to permit access to a particular securable compartment associated with the received compartment access information;
    wherein the autonomous road vehicle is further operative to receive, after beginning to drive toward the first destination and prior to reaching the first destination a second destination based at least in part on a location of a mobile communication device associated with the access information of the particular securable compartment, and to drive toward the second destination instead of continuing to drive toward the first destination.

2. The package delivery platform of claim 1, wherein the compartment access information comprises a personal identification number (PIN), and wherein the access information interface comprises a PIN pad to receive a PIN as a component of the compartment access information.

3. The package delivery platform of claim 1, wherein the compartment access information comprises a payment amount; wherein the access subsystem comprises a payment subsystem operative to receive payment information; and wherein the access subsystem is operative to permit access to the particular securable compartment upon receiving at least payment information corresponding to the payment amount.

4. The package delivery platform of claim 3, wherein the payment subsystem comprises a payment card reader to receive the payment information.

5. The package delivery platform of claim 1, wherein the autonomous road vehicle is further operative to receive, prior to reaching the second destination, an undated destination corresponding to a changed location of the mobile communication device associated with the access information of the particular securable compartment, and to drive toward the updated destination instead of continuing to drive toward the second destination.

6. The package delivery platform of claim 1, wherein the compartment access information comprises information communicable via near field communication (NFC); and wherein the access subsystem comprises at least one of an NFC initiator and an NFC target to receive access information communicable via NFC.

7. A package delivery system, comprising:
    a package securing subsystem comprising at least one securable compartment, each securable compartment operative to secure at least one package therein, each securable compartment associated with corresponding compartment access information;

a positioning system operative to receive a first destination for each package, and to determine a location of the package securing subsystem; and an access subsystem comprising at least one access information interface and operative, upon both (a) the determined location of the package securing subsystem matching the most current received destination and (b) receipt through the at least one access information interface of compartment access information, to permit access to a particular securable compartment associated with the received package access information;

wherein the positioning system is further operative to receive, prior to reaching the first destination, a second destination based at least in part on a location of a mobile communication device associated with the access information of the particular securable compartment.

8. The package delivery system of claim 7, wherein the access information comprises a personal identification number (PIN), and wherein the access information interface comprises a PIN pad to receive a PIN as a component of the package access information.

9. The package delivery system of claim 7, wherein the access information comprises a payment amount; wherein the access subsystem comprises a payment subsystem operative to receive payment information; and wherein the access subsystem is operative to permit access to the particular securable compartment upon receiving payment information corresponding to the payment amount.

10. The package delivery system of claim 7, wherein the payment subsystem comprises a payment card reader for receiving payment information.

11. The package delivery system of claim 7 wherein is further operative to receive, prior to reaching the second destination, an updated destination corresponding to a changed location of the mobile communication device associated with the access information of the particular securable compartment.

12. The package delivery system of claim 7, wherein the access information comprises information communicable via near field communication (NFC); and wherein the secured package access subsystem comprises at least one of an NFC initiator and an NFC target to receive access information communicable via NFC.

13. A method to deliver packages, comprising:
providing a package delivery platform comprising:
an autonomous road vehicle operative to receive a first destination and to drive toward the first destination;
a package securing subsystem attached to the autonomous road vehicle and comprising at least one securable compartment, each securable compartment operative to secure at least one package therein, each securable compartment associated with corresponding compartment access information;
a positioning system operative to determine a location of the package delivery platform; and
an access subsystem comprising at least one access information interface and operative, upon both (a) the determined location of the package delivery platform matching a most current received destination and (b) receipt through the at least one access information interface of compartment access information, to permit access to a particular securable compartment associated with the received compartment access information and the most current destination information;

wherein the autonomous road vehicle is further operative to receive, prior to reaching the first destination, a second destination based at least in part on a location of a mobile communication device associated with the access information of the particular securable compartment, and to drive toward the second destination;

securing a package, associated with the first destination and a first compartment access information, in a first securable compartment of the package securing system;

autonomously driving the autonomous road vehicle toward a first destination based on the first destination information;

receiving, by the autonomous road vehicle and prior to reaching the first destination, a second destination, based at least in part on a reported location of a mobile communication device associated with the first compartment access information;

autonomously driving the autonomous road vehicle toward the second destination instead of the first destination based on the received second destination;

receiving, via the at least one access information interface and after arrival at the second destination, the first compartment access information; and permitting, by the access subsystem and in response to receiving the first compartment access information while the autonomous road vehicle is at the second destination, access to the first securable compartment.

14. The method of claim 13,
wherein the compartment access information comprises a personal identification number (PIN) and the access subsystem comprises a PIN pad to receive a PIN as a component of the compartment access information; and
wherein receiving, via the at least one access information interface, the first compartment access information comprises receiving the PIN via the PIN pad.

15. The method of claim 13,
wherein the compartment access information comprises a payment amount and the access subsystem comprises a payment subsystem operative to receive payment information; and
wherein receiving, via the at least one access information interface, the first compartment access information comprises receiving the payment information via the payment system.

16. The method of claim 15, wherein providing the package delivery platform further comprises providing the payment subsystem further comprising a payment card reader to receive payment information.

17. The method of claim 13, wherein providing the package delivery platform further comprises providing an autonomous road vehicle that is further operative to receive, prior to reaching the second destination, an updated destination corresponding to a changed location of the mobile communication device associated with the access information of the particular securable compartment, and to drive toward an updated destination based on receiving the updated destination.

18. The method of claim 13, wherein the compartment access information comprises information communicable via near field communication (NFC) and the access subsystem comprises at least one of an NFC initiator and an NFC target to receive access information communicable via NFC.

* * * * *

UNITED STATES PATENT AND TRADEMARK OFFICE
CERTIFICATE OF CORRECTION

| | |
|---|---|
| PATENT NO. | : 9,256,852 B1 |
| APPLICATION NO. | : 13/933109 |
| DATED | : February 9, 2016 |
| INVENTOR(S) | : Jussi Myllymaki |

It is certified that error appears in the above-identified patent and that said Letters Patent is hereby corrected as shown below:

In the Claims:

Column 12, Claim 1, Line 29 should read "--destination and prior to reaching the first destination, a second--"

Column 13, Claim 10, Line 31 should read "--The package delivery system of Claim 9, wherein the--"

Signed and Sealed this
Third Day of May, 2016

Michelle K. Lee
*Director of the United States Patent and Trademark Office*